United States Patent [19]
Hobson

[11] Patent Number: 5,889,631
[45] Date of Patent: Mar. 30, 1999

[54] DETECTING A TRACK TEAR SERVO DEFECT CONDITION IN A HARD DISC DRIVE

[75] Inventor: Daniel Eugene Hobson, Yukon, Okla.

[73] Assignee: Seagate Technology, Inc., Scotts Valley, Calif.

[21] Appl. No.: 831,487

[22] Filed: Mar. 31, 1997

Related U.S. Application Data

[60] Provisional application No. 60/031,376 Nov. 19, 1996.
[51] Int. Cl.[6] .................................................. G11B 5/596
[52] U.S. Cl. ............................................. 360/75; 360/69
[58] Field of Search .................... 360/77.08, 75, 360/77.05, 77.02, 77.07, 69

[56] References Cited

U.S. PATENT DOCUMENTS

| | | |
|---|---|---|
| 5,136,439 | 8/1992 | Weispfenning et al. . |
| 5,262,907 | 11/1993 | Duffy et al. . |
| 5,276,662 | 1/1994 | Shaver, Jr. et al. . |
| 5,475,545 | 12/1995 | Hampshire et al. . |
| 5,523,902 | 6/1996 | Pederson .............................. 360/78.12 |
| 5,710,677 | 1/1998 | Teng et al. ............................ 360/77.08 |
| 5,760,990 | 6/1998 | Ukani et al. .......................... 360/77.08 |
| 5,771,131 | 6/1998 | Prizadeh ............................... 360/77.08 |

Primary Examiner—Nabil Hindi
Attorney, Agent, or Firm—Crowe & Dunlevy

[57] ABSTRACT

Apparatus and method for evaluating the presence of a track tear servo defect in a disc drive, characterized as a stepwise radial discontinuity so that the track ends at a different radius than it begins is disclosed for a disc drive. A first defect log is generated for a selected track, the first defect log providing an indication of detected defects for each servo frame associated with the selected track. At such time that a selected servo frame is identified as having a defect, a second defect log is generated for the selected track while the position information provided by the selected servo frame is ignored. The second defect log is then evaluated to determine whether any defects are detected for the remaining servo frames. At such time that a defect appears in the second defect log for a servo frame immediately following the selected servo frame, a track tear condition is declared.

8 Claims, 6 Drawing Sheets

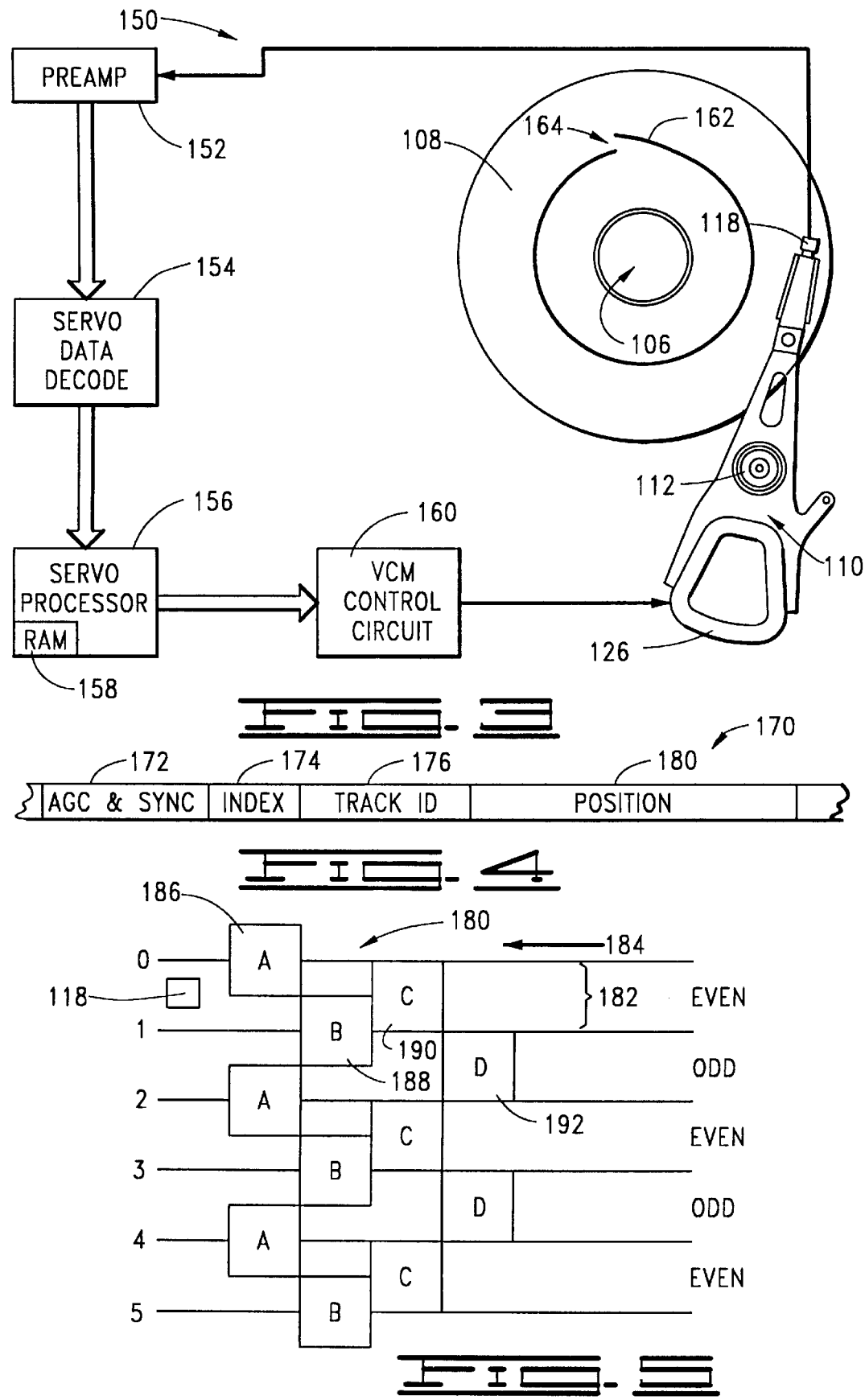

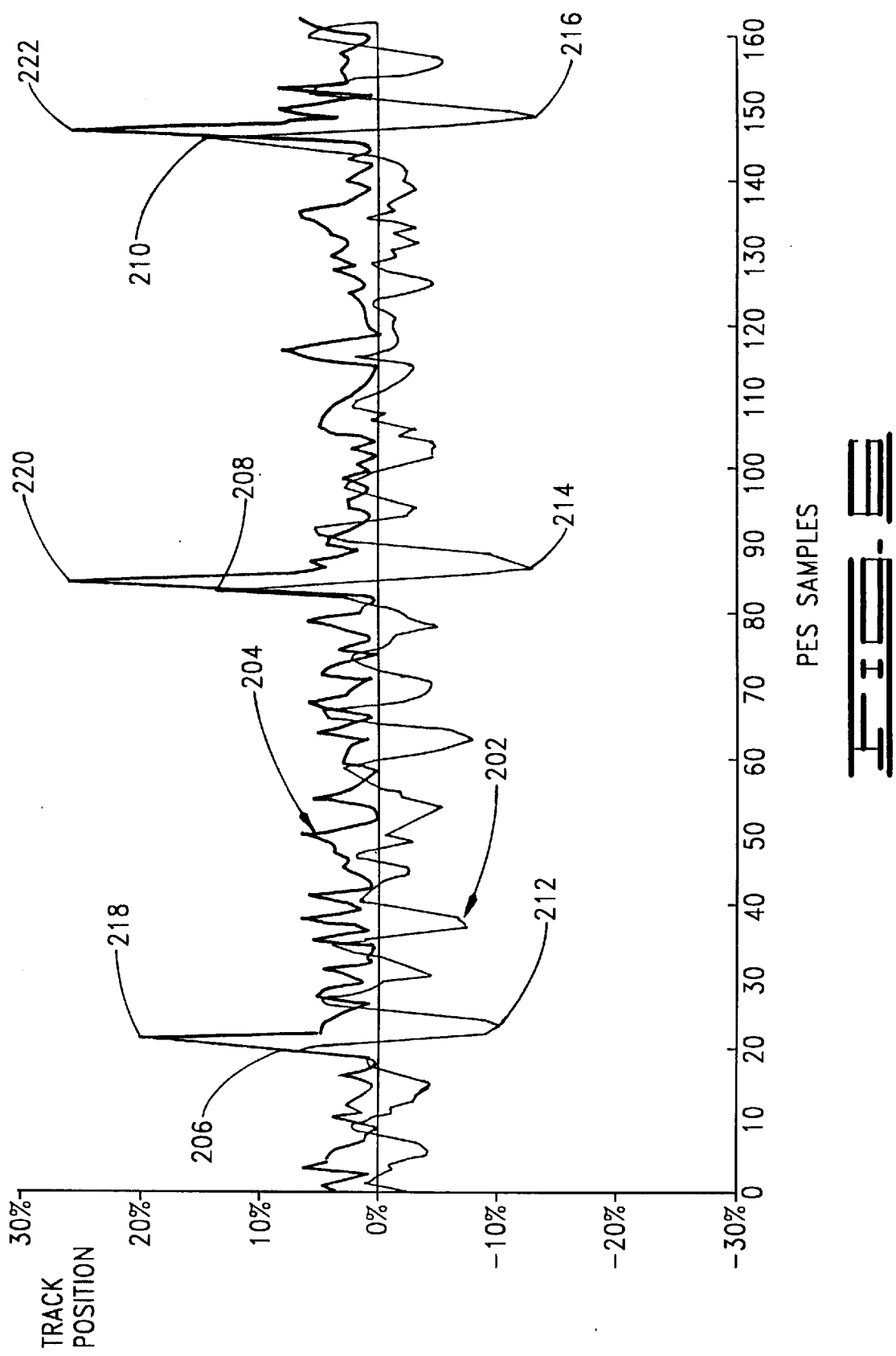

DETECTING A TRACK TEAR SERVO DEFECT CONDITION IN A HARD DISC DRIVE

RELATED APPLICATIONS

This application claims priority to Provisional Application Ser. No. 60/031,376 filed Nov. 19, 1996.

FIELD OF THE INVENTION

This invention relates generally to the field of disc drive data storage devices, and more particularly, but not by way of limitation, to the detection of a track tear condition in a disc drive, a track tear being a radial discontinuity such that beginning and ending points of the track are radially displaced.

BACKGROUND

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of a magnetic circuit comprising one or more permanent magnets and magnetically permeable pole pieces. When controlled DC current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

Control of the position of the heads is typically achieved with a closed loop servo system such as disclosed in U.S. Pat. No. 5,262,907 entitled HARD DISC DRIVE WITH IMPROVED SERVO SYSTEM, issued to Duffy et al., assigned to the assignee of the present invention. A typical servo system utilizes servo information (written to the discs during the disc drive manufacturing process) to detect and control the position of the heads through the generation of a position error signal (PES) which is indicative of the position of the head with respect to a selected track. More particularly, the PES is typically presented as a position dependent signal having a magnitude indicative of the relative distance between the head and the center of a track and a polarity indicative of the direction of the head with respect to the track center. Thus, it is common for the PES to have normalized values corresponding to a range of, for example −1.0 to +1.0, as the head is swept across a selected track and to have a value corresponding to a value of 0 when the head is positioned over the center of the track. As will be recognized, modern servo systems typically generate the PES as a sequence of digital samples which generally correspond to the above analog range.

The PES is generated by the servo system by comparing the relative signal strengths of burst signals generated from precisely located magnetized servo fields in the servo information on the disc surface. The servo fields are generally arranged in an offset pattern so that, through manipulation of the magnitudes of the burst signals provided to the servo system as the servo fields are read, the relative position of the head to a particular track center can be determined and controlled. More particularly, digital representations of the analog burst signals are typically provided to a servo loop microprocessor (or digital signal processor), which obtains a digital representation of the value of the PES from a selected combination of the input digital representations of the analog burst signals. The microprocessor then compares the value of the PES to a desired value indicative of the desired position of the head to the selected track and issues a digital correction signal to the power amplifier, which in turn provides an analog current to the actuator coil to adjust the position of the actuator.

It will be recognized that accurate control of the position of the heads is of paramount importance in the reliable reading and writing of data to the discs. The servo loop generally attempts to maintain the head over the center of the selected track so as to minimize the potential for overwriting data on adjacent tracks or having the magnetization of adjacent tracks interfere with the reading of the data stored on the selected track. Thus, it is common during read and write operations to compare the absolute value of each PES sample to a predetermined safe-threshold value in order to assure the head is correctly positioned relative to the track. Should the value of the PES for a particular sample exceed the threshold, the read or write operation is temporarily suspended until the PES is brought back down to a safe value.

A selected PES sample may have a value that exceeds the safe-threshold value during a read or write operation for a variety of reasons. One such reason is that the head is actually positioned off track center a distance sufficient to exceed the threshold value; particularly, it will be recognized that mechanical shocks supplied to the disc drive during operation can result in movement of the head away from the center of the selected track (sometimes referred to as an off-track condition). As a result, it is desirable to suspend the read or write operation until such off-track condition can be corrected.

Another reason that a selected PES sample may have a value that exceeds the safe-threshold value is the existence of a localized defect in the servo information associated with the PES sample; in such a case, the head is correctly located with respect to the track, but the reported PES sample erroneously indicates otherwise. Such a defect in the servo information can occur as a result of a localized anomaly in the media on the surface of a disc, so that the media does not possess the necessary magnetic properties to allow the servo information to be written at this location. Additionally, errors can occur during the servo track writing process during manufacture of the disc drive, so that incorrect servo information is provided to the disc at a particular location.

Regardless of the source of the defect in the servo information, such a defect is typically manifested as a one sample error in the PES. The erroneous PES sample does not provide a true indication of head position relative to the center of the selected track, and further, if the erroneous PES sample is interpreted by the servo loop as an impulse function, an unwanted oscillatory response will be induced into the system.

Because of the problems associated with defects in the servo information, it is desirable to provide a servo loop which is capable of determining when an off-track condition is caused by a true positioning problem (and make the necessary position corrections) and when an off-track condition is caused by a servo defect (and ignore the erroneous PES sample). However, prior art servo loops have heretofore been generally unsuccessful in distinguishing excursions in the PES that are caused by servo defects from those caused by external shocks to a drive. This is particularly true in servo loops which rely on the PES value to identify off-track conditions.

The servo information, including the servo fields, are written to the discs during the manufacturing process using a highly precise servo track writer. Although methodologies vary in the writing of the servo information, typically the disc drive is mounted on the servo track writer and the appropriate write signals are provided to the heads of the disc drive to write the servo information while the discs are rotated by the disc drive spindle motor. A mechanical pusher arm is used to incrementally advance the heads over the surfaces of the discs while a closed loop positional control system is used to locate the heads relative to the discs.

Occasionally, a particularly egregious type of defect in the servo information known as a "track tear" can be generated during the servo track write process. A track tear is characterized as a radial discontinuity, so that a track having a track tear ends at a different radius than it begins; that is, the radius of the track varies with respect to angular position over at least a portion of the track. Vibrations, mechanical shocks and errors in the servo track writer position control system can contribute to the generation of a track tear condition.

It will be recognized that a track tear provides a unique situation for a disc drive, in that mapping out and coasting over the servo information at the discontinuity will not resolve the defect, unlike other types of servo defects wherein mapping out and coasting over the defect generally provides adequate compensation for the defect. Mapping out and coasting over a track tear merely "shifts" the defect to the next frame on the track. Whereas a regular servo defect generates what may be characterized as a "spike" in the PES, a track tear generates a "step function" in the PES. The significance of this distinction is that with regard to a track tear, during subsequent operation of the drive the head will continue to be displaced with respect to the track even after the first frame associated with the radial discontinuity of the track tear has been mapped out.

Even though the displacement associated with a track tear can be relatively small, during write operations the disc drive closely monitors the position of the head and will declare a write fault if the head is displaced from the center of the track a small amount, which is typically around 10% of the width of the track. Thus, even a relatively small track tear can result in the repeated declaration of a write fault by the disc drive each time the head attempts to write data proximate to the track tear. Such write faults will not be corrected by mapping out the first frame associated with the track tear, as the write fault will merely be shifted to the next frame immediately following the mapped out frame.

Heretofore, the prior art has not been able to adequately distinguish between servo defects and actual head displacements, and further has not been able to adequately distinguish between regular servo defects and track tear conditions. Accordingly, there is a need for an improved approach to detecting servo defects in general, and more particularly to detect track tear conditions in a disc drive.

SUMMARY OF THE INVENTION

The present invention provides an apparatus and method for evaluating the presence of a track tear servo defect in a disc drive, characterized as a stepwise radial discontinuity so that the track ends at a different radius than it begins.

In accordance with the preferred embodiment, a first defect log is generated for a selected track, the first defect log providing an indication of detected defects for each servo frame associated with the selected track. At such time that a selected servo frame is identified as having a defect, a second defect log is generated for the selected track while the position information provided by the selected servo frame is ignored. The second defect log is then evaluated to determine whether any defects are detected for the remaining servo frames. At such time that a defect appears in the second defect log, for a frame immediately following the selected servo frame, a track tear condition is declared and the drive is rejected. As desired, additional discrimination between a track tear condition and multiple, discrete servo defects can be readily obtained by determining whether the defect appearing in the second defect log immediately following the selected servo frame also appears in the first defect log.

These and various other features as well as advantages which characterize the present invention will be apparent from a reading of the following detailed description and a review of the associated drawings.

BRIEF DESCRIPTION OF THE DRAWINGS

FIG. 3 provides a functional block diagram of a servo control circuit shown in FIG. 2 and includes a representation of a track having a track tear.

FIG. 4 provides a representation of the general format of a servo frame used by the servo control circuit of FIG. 3.

FIG. 5 shows A, B, C and D burst patterns of the servo frame of FIG. 4.

FIG. 6 is a graphical representation of PES samples and corresponding second difference terms, illustrating the capability of the second difference terms to distinguish between true and erroneous PES samples.

DETAILED DESCRIPTION

Figure 1:
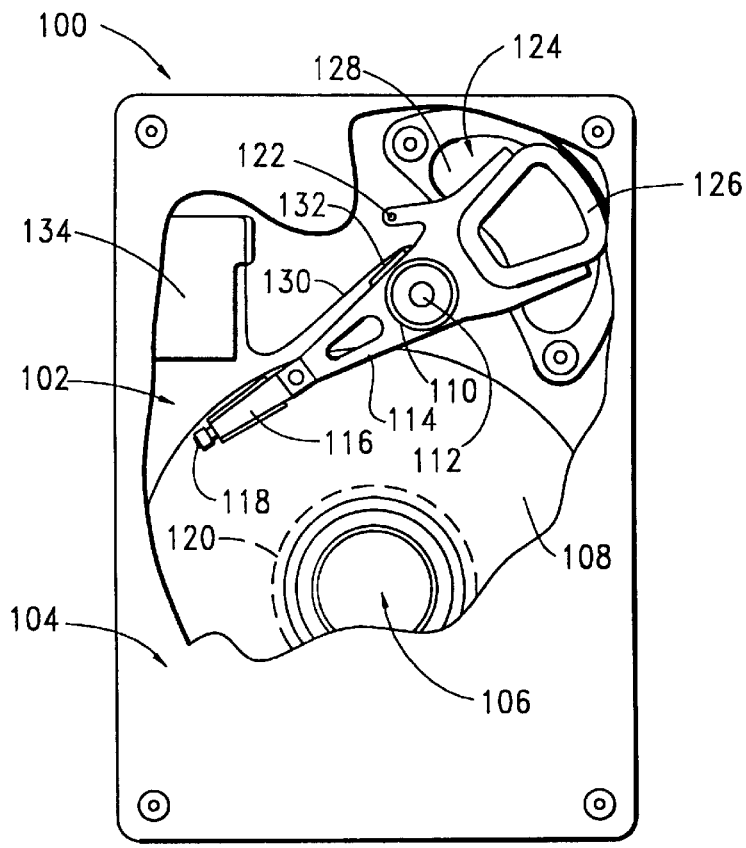
FIG. 1 shows a disc drive constructed in accordance with the preferred embodiment of the present invention.

Referring now to FIG. 1, shown therein is a disc drive 100 constructed in accordance with the preferred embodiment of the present invention. The disc drive 100 includes a base deck 102 to which various components of the disc drive 100 are mounted. A top cover 104 (shown in partial cutaway fashion) cooperates with the base deck 102 to form an internal, sealed environment for the disc drive in a conventional manner.

A spindle motor (shown generally at 106) rotates one or more discs 108 at a constant high speed. Information is written to and read from tracks (not designated) on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes a slider assembly (not separately designated) designed to enable the head 118 to fly in close proximity to the corresponding surface of the associated disc 108.

At such time that the disc drive 100 is not in use, the heads 118 are moved over park zones 120 near the inner diameter of the discs 108. The heads 118 are secured over the park zones 120 through the use of a conventional latch arrangement, such as designated at 122, which prevents inadvertent rotation of the actuator assembly 110 when the heads are parked.

The radial position of the heads 118 is controlled through the use of a voice coil motor (VCM) 124, which as will be recognized typically includes a coil 126 attached to the actuator assembly 110, as well as one or more permanent magnets 128 which establish a magnetic field in which the coil 126 is immersed. Thus, the controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
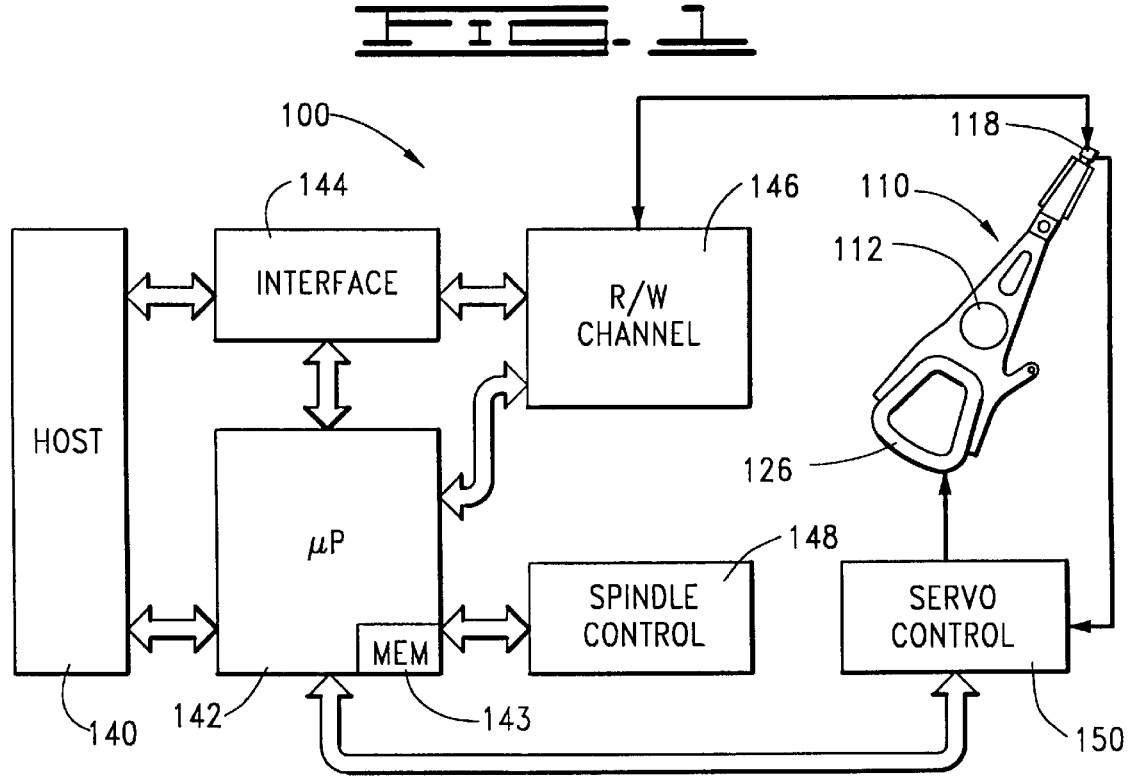
FIG. 2 provides a functional block diagram of the disc drive of FIG. 1 operably connected to a host computer in which the disc drive can be mounted.

Referring now to FIG. 2, shown therein is a functional block diagram of the disc drive 100 of FIG. 1, generally showing the main functional circuits which are resident on the disc drive printed circuit board and used to control the operation of the disc drive 100.

The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include RAM, ROM and other sources of resident memory for the microprocessor 142.

Data are transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

The discs 108 are rotated at a constant high speed by a spindle control circuit 148, which typically electrically commutates the spindle motor 106 (FIG. 1) through the use of back emf sensing. Spindle control circuits such as represented at 148 are well known and will therefore not be discussed further herein; additional information concerning spindle control circuits is provided in U.S. patent application Ser. No. 08/524,342 filed Sep. 6, 1995 by Stanley H. Dinsmore.

As discussed above, the radial position of the heads 118 is controlled through the application of current to the coil 126 of the actuator assembly 110. Such control is provided by a servo control circuit 150, a functional block diagram of which is provided in FIG. 3.

Referring now to FIG. 3, the servo control circuit 150 includes a preamp circuit 152, a servo data and decode circuit 154, a servo processor 156 with associated servo RAM 158 and a VCM control circuit 160, all of which cooperate in a manner to be discussed in greater detail below to control the position of the head 118. For reference, the preamp circuit 152 is typically located on the printed circuit board 132 (FIG. 1) as it has been found to be generally advantageous to locate the preamp circuit 152 in close proximity to the heads 118.

It will be recognized that servo control generally includes two main types of operation: seeking and track following. A seek operation entails moving a selected head 118 from an initial track to a destination track on the associated disc surface through the initial acceleration and subsequent acceleration of the head 118 away from the initial track and towards the destination track. Once the head 118 is settled on the destination track, the disc drive enters a track following mode of operation wherein the head 118 is caused to follow the destination track until the next seek operation is to be performed. Such operations are well known in the art and are discussed, for example, in the previously referenced Duffy U.S. Pat. No. 5,262,907 as well as in U.S. Pat. No. 5,475,545 issued Dec. 12, 1995 to Hampshire et al. In order to better set forth the preferred embodiment of the present invention, however, the general operation of the servo control circuit 150 during track following will now briefly be discussed.

With continued reference to FIG. 3, analog burst signals are provided by the head 118 at such time that servo information associated with the track being followed passes under the head 118. The burst signals are amplified by the preamp circuit 152 and provided to the servo data decode circuit 154, which includes analog-to-digital converter (ADC) circuitry that converts the analog burst signals to digital form. The digitized signals are then provided to the servo processor 156, which in the preferred embodiment is a digital signal processor (DSP).

The servo processor 156 determines a position error signal from the relative magnitudes of the digital representations of the burst signals and, in accordance with commands received from the disc drive microprocessor 142 (FIG. 2), determines the desired position of the head 118 with respect to the track. It will be recognized that, generally, the optimal position for the head 118 with respect to the track being followed is over track center, but offsets (as a percentage of the width of the track) can sometimes be advantageously employed during, for example, error recovery routines. In response to the desired relative position of the head 118, the servo processor 156 outputs a current command signal to the VCM control circuit 160, which includes an actuator driver (not separately designated) that applies current of a selected magnitude and direction to the coil 126 in response to the current command signal. The disc drive 100 employs an embedded servo scheme which involves the interleaving of the servo information with user data on each track of the discs 108. The servo control circuit 150 thus generates estimates of head position, velocity and acceleration at such times that the head 118 is disposed over the user data portions of the track and uses these estimates to generate control signals to maintain the head 118 over the user data portions of the track.

FIG. 3 further provides a representation of a track 162 having a track tear at 164. The track tear 164 causes the track 162 to have an ending point which is radially displaced a certain distance from a corresponding beginning point. As disc drives of the current generation have achieved track densities of greater than 2000 tracks per centimeter (5000/inch), it will be clearly understood that the radial displacement of the track tear 164 of FIG. 3 is exaggerated and has been provided merely for purposes of facilitating the present discussion. The methodology in which the preferred embodiment of the present invention advantageously detects track tears such as illustrated at 164 will be discussed in greater detail hereinbelow.

The servo information on the discs 108 is recorded during the manufacturing of the disc drive 100 using a highly precise servo track writer. The servo information serves to define the boundaries of each of the tracks and is divided circumferentially into a number of frames, with user data portions disposed therebetween. The general format of a servo frame 170 is shown in FIG. 6 and comprises a plurality of fields, including an AGC & Sync field 172, an index field 174, a track ID field 176 and a position field 180. Of particular interest is the position field 180, but for purposes of clarity it will be recognized that the AGC & Sync field 172 provides input for the generation of timing signals used by the disc drive 100, the index field 174 indicates radial position of the track and the track ID field 176 provides the track address. Of course, other fields may be used as desired and the format of the fields in a servo frame will depend upon the construction of a particular disc drive. For reference, each track has around 60 frames with user data interleaved therebetween.

The position field 180 comprises four position burst fields arranged in an offset, quadrature pattern for a plurality of adjacent tracks, as shown in FIG. 5. More particularly, FIG. 5 shows the position field 180 to comprise burst patterns A, B, C and D having selected geometries and magnetization vectors, defining a plurality of track boundaries identified as 0–5. Thus, each track comprises the area bounded by two adjacent track boundaries. Additionally, the head 118 of FIG. 1 is represented in FIG. 5 as being centered on the track bounded by track boundaries 0 and 1 (said track being identified at 182). The direction of rotation of the discs 108 (and hence the position field 180) relative to the head 118 is shown by arrow 184.

Both the A and B burst patterns are shown to extend from the center of one track to the center of an immediately adjacent track, with these patterns offset as shown. Additionally, the C and D burst patterns extend from one track boundary to the next track boundary, with these patterns also offset as shown. Thus, as the head 118 passes over the position field 180 on track 182, the head will pass over portions of the A and B burst patterns (identified as 186 and 188, respectively) and then over C burst pattern 190. However, the head 118 will not encounter D burst pattern 192, as this pattern is on an adjacent track. For reference, tracks having C burst patterns are referred to as "even tracks" and tracks with D burst patterns are referred to as "odd tracks".

Generally, it will be recognized that when the head 118 is centered at the mid-point of track 182, the amplitude of an A burst signal induced in the head 118 by the A burst pattern 186 will be nominally equal to the amplitude of a B burst signal induced in the head by the B burst pattern 188. Moreover, the amplitude of a C burst signal induced by the C burst pattern 190 will have a nominal maximum value and the amplitude of a D burst signal from the D burst pattern 192 will be nominally zero. Further, when the head 118 is positioned over the track boundary 1, the amplitudes of the C and D burst signals from the patterns 190 and 192 will be equal in magnitude, the B burst signal from the pattern 188 will have a maximum value and the A burst from the pattern 186 will be zero. Thus, as the head 118 is swept from one track boundary to the next, the amplitudes of the A, B, C and D burst signals cycle between zero and maximum values. The servo processor 156 (FIG. 3) utilizes the relative magnitudes of the burst signals in order to generate the PES and to adjust the amount of current applied to the coil 126 (FIG. 3).

It follows that the correct relative magnitudes (within acceptable tolerance levels) must be obtained from the A, B, C and D burst patterns in order for the servo control circuit 150 to be able to control the position of the heads 118 with respect to the discs 108 and that servo defects, whether caused by localized media anomalies or by erroneous servo information interfere with the ability of the servo control circuit 150 to so properly operate. As provided above, the preferred embodiment of the present invention is particularly directed to the detection of track tears 164 such as illustrated in FIG. 3; however, in the preferred embodiment it has been found advantageous to first identify all servo defects on the discs 108 and then to evaluate these servo defects to determine whether such defects result from a track tear condition. Routines to carry out these respective operations are set forth with regard to FIGS. 7–9 and will be discussed in greater detail hereinbelow.

It will be helpful, however, to first discuss the manner in which the preferred embodiment identifies the presence of servo defects and distinguishes the same from mere true position errors in the head. Such methodology has been disclosed in copending United States patent application Ser. No. 08/723,513 entitled DETECTING SERVO DEFECTS IN A DISC DRIVE, filed Sep. 30, 1996 by Gregg et al, assigned to the assignee of the present invention.

Accordingly, to distinguish between erroneous PES samples and true PES samples, the servo control circuit 150 first operates to generate an estimate term as a selected combination of PES samples. More particularly, the estimate term, $A_n$, is defined by the following relationship:

$$A_n = |S_n - 2S_{n-1} + S_{n-2}| \quad (1)$$

with n being an integer representative of each sequential sample of servo burst signals received by the servo control circuit 150, $S_n$ representing the PES sample at sample n, $S_{n-1}$ being the previous PES sample and $S_{n-2}$ being the second previous PES sample. Thus, the estimate term $A_n$, which is a second difference of the PES, is generated from three successive PES samples and used in the identification of servo defects, as described more fully hereinbelow.

Generally, the ability of the second difference $A_n$ to detect erroneous PES samples is illustrated by FIG. 6, which provides a graphical representation of PES samples (curve 202) and second difference estimates (curve 204) generated therefrom, in accordance with equation (1) above. The horizontal axis of FIG. 6 represents a sample number n in a sequence of samples (for reference, there are 160 samples in this example). The vertical axis of FIG. 6 represents track width, with 0% indicative of the center of the selected track and variations therefrom indicative of the percentage of track-width away from track center.

For purposes of illustration, the curve 202 of FIG. 6 is considered to be generated as a result of the servo control circuit 150 operating to maintain the head 118 (FIG. 5) nominally over the center of the track 182 (also shown in FIG. 5). That is, each PES sample of the curve 202 of FIG. 6 is generated in accordance with the magnitudes of servo burst signals generated by the head 118 from the servo position fields 180 associated with the track 182. Further, the curve 204 is generated from the PES samples of the curve 202, using equation (1) above. It will be recognized that, as a result of the absolute value function included in equation (1), all of the points of the curve 204 are above the center of the track 182 (i.e., above 0%).

As shown in FIG. 6, servo defects are represented at points 206, 208 and 210 of the curve 202, each of which provide generally localized spikes in the PES. More particularly, the PES samples at points 206, 208 and 210 are representative of localized excursions in the PES. These excursions in the PES (falsely) indicate to the servo control circuit 150 that the head 118 has moved to positions substantially away from the center of the track 182, when in fact the PES samples at points 206, 208 and 210 are erroneous, in that no such excursions by the head 118 have actually taken place at the points 206, 208 and 210.

As a result of the erroneous PES samples at points 206, 208 and 210, in this example the servo control circuit 150 operates to correct these indicated excursions by outputting a correction signal to move the head 118 to the center of the track 182. However, as the head 118 is not actually off-track at the points 206, 208 and 210, the operation of the servo control circuit 150 to correct the position of the head 118 results in large excursions of the head 118 in the opposite direction, as indicated at points 212, 214 and 216. Thus, the erroneous PES samples at points 206, 208 and 210 result in undesirable corrections and oscillation of the head 118 at points 212, 214 and 216 (and beyond), immediately following the erroneous PES samples.

Additionally, the prior art methodology of detecting off-track conditions by comparing the value of each PES sample to a predetermined threshold, which is typically a value such as 10% off track center, would result in the detection of the second two erroneous PES samples at points 208 and 210, but not the erroneous PES sample at point 206. Thus, the marginal servo defect at point 206 would not be detected using the prior art methodology of detecting off-track conditions using an off-track threshold of 10%, although the marginal servo defect at point 206 results in excessive oscillation of the PES, as shown.

Continuing with FIG. 6, the curve 204, showing the second difference of the PES samples of curve 202, accurately detects the defects at points 206, 208 and 210 of the curve 202. That is, the curve 204 includes localized peaks at points 218, 220 and 222, each of which closely follow (by two sample points) the erroneous PES samples indicated at points 206, 208 and 210 of the curve 202. Moreover, the values of the second difference curve 204 at points 218, 220 and 222 have magnitudes that are significantly greater than the magnitudes at remaining portions of the curve 204.

From FIG. 6, it will be recognized that the value of the second difference $A_n$ will provide a relatively large increase in magnitude subsequent to each erroneous PES sample in the PES. However, reliable detection of servo defects in the PES (as compared to actual excursions of the head) has been found to be improved through the characterization of changes in magnitude of the second difference $A_n$.

Figure 7:
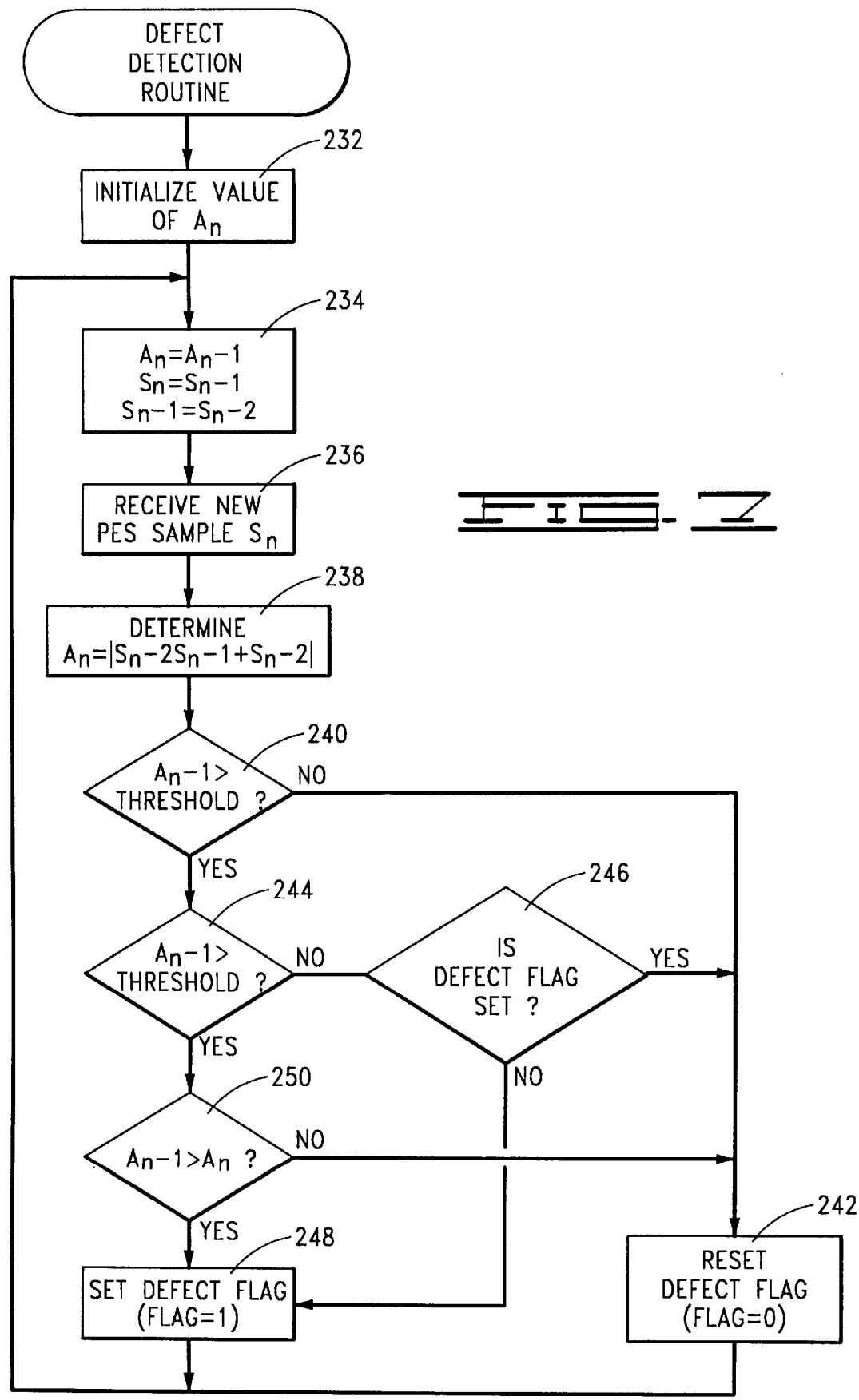
FIG. 7 is a generalized flow chart representative of a DEFECT DETECTION routine used by the servo microprocessor of FIG. 3 in accordance with the preferred embodiment of the present invention to detect servo defects in the servo information written to the disc drive.

Referring now to FIG. 7, shown therein is a flow chart for a DEFECT DETECTION routine performed by the servo control circuit 150 (FIG. 3) during read and write operations wherein a selected head is positioned over the center of a selected track of the disc drive 100. More particularly, the DEFECT DETECTION routine of FIG. 7 is representative of programming stored in servo RAM 158 (FIG. 3) and used by the servo processor 156 during operation of the servo control circuit 150. As provided above, the routine of FIG. 7 is preferably performed in conjunction with the routines of FIG. 8 or 9 during screening tests performed on the disc drive 100 during manufacturing. Moreover, as described below the routines of FIGS. 7 and 8 (or 9) are sequentially performed on each track on the discs 108 containing servo information.

As shown in FIG. 7, the DEFECT DETECTION routine begins at block 232, wherein the value of $A_n$ is initialized. As provided by equation (1) above, the first value of $A_n$ requires receipt of three consecutive PES samples ($S_{n-2}$, $S_{n-1}$ and $S_n$). Thus, once the servo control circuit 150 begins track following mode, the routine of FIG. 7 waits for three samples of servo bursts (and resulting PES samples) before the first second difference value is generated by block 232. Thereafter, the routine passes to block 234, wherein the value of $A_n$ determined by block 232 is set to $A_{n-1}$. Additionally, the PES sample $S_{n-1}$ is set to $S_{n-2}$ and the PES sample $S_n$ is set to $S_{n-1}$, in preparation for receipt of the next PES sample (which is identified as $S_n$), at block 236.

Once the new $S_n$ sample is received by block 236, a new value for the second difference $A_n$ is determined, as shown by block 238. At this point, values are now available for both $A_n$ and $A_{n-1}$, and it is the relative magnitudes of these two second difference values which determine the presence of servo defects. For purposes of discussion herein, $A_n$ will be referred to as the present second difference and $A_{n-1}$ will be referred to as the previous second difference. Although not shown as such in FIG. 7, it will be recognized that the previous second difference $A_{n-1}$ can be considered as being generated from the three immediately previous samples $S_{n-1}$, $S_{n-2}$, and $S_{n-3}$, with reference to the present sample, $S_n$.

Continuing with FIG. 7, decision block 240 compares the magnitude of the previous second difference $A_{n-1}$ to a predetermined defect threshold value. This threshold value is preferably experimentally determined, but generally corresponds, for example, to a selected percentage of the width of the track, such as 20% (see FIG. 6). At such time that the previous second difference $A_{n-1}$ does not exceed the defect threshold value, the flow of FIG. 7 passes to block 242, wherein a defect flag is reset to a value indicating the absence of a servo defect (such as, for example defect flag=0). As will be recognized, the defect flag can correspond, for example, to a location in a defect log (defect map) stored in memory and used by the servo processor 156. Operations by the disc drive 100 in response to the defect flag will be discussed more fully hereinbelow.

At such time that the previous second difference $A_{n-1}$ does exceed the defect threshold value, the flow of FIG. 7 continues to block 244, wherein the present second difference $A_n$ is likewise compared to the defect threshold value. At such time that the present second difference $A_n$ does not exceed the defect threshold value, the flow passes to decision block 246, where the routine queries whether the defect flag (discussed above with reference to the block 242) has been previously set during a previous pass of the routine. If so, the routine passes to the block 242, wherein the defect flag is reset to the value indicative of no servo defect. If not, the routine passes from decision block 246 to block 248, wherein the defect flag is set to a value indicative of a servo defect (such as, for example defect flag=1).

Returning to the decision block 244, at such time that the present second difference $A_n$ also exceeds the defect threshold value, the flow of FIG. 7 passes to decision block 250, wherein the value of the previous second difference $A_{n-1}$ is compared to the value of the present second difference $A_n$. At such time that $A_{n-1}$ is less than $A_n$, the flow passes as shown to block 242, wherein the defect flag is reset. However, at such time that $A_{n-1}$ is greater than $A_n$, the flow passes from the decision block 250 to block 248, wherein the defect flag is set to indicate the presence of a servo defect.

Once the routine passes to either block 242, wherein the defect flag is set to 0 (indicative of no servo defect) or to block 248, wherein the defect flag is set to 1 (indicative of the presence of a servo defect), the routine returns as shown back to block 234, wherein the routine prepares for receipt and evaluation of the next PES sample. In the preferred embodiment, the routine of FIG. 7 continues to operate until all of the PES samples for the particular track have been received and evaluated and all servo defects on the track, if any, have been indicated and stored in a defect log, which comprises a memory map having addresses corresponding to each of the frames 170 (FIG. 4) on the selected track.

Figure 8:
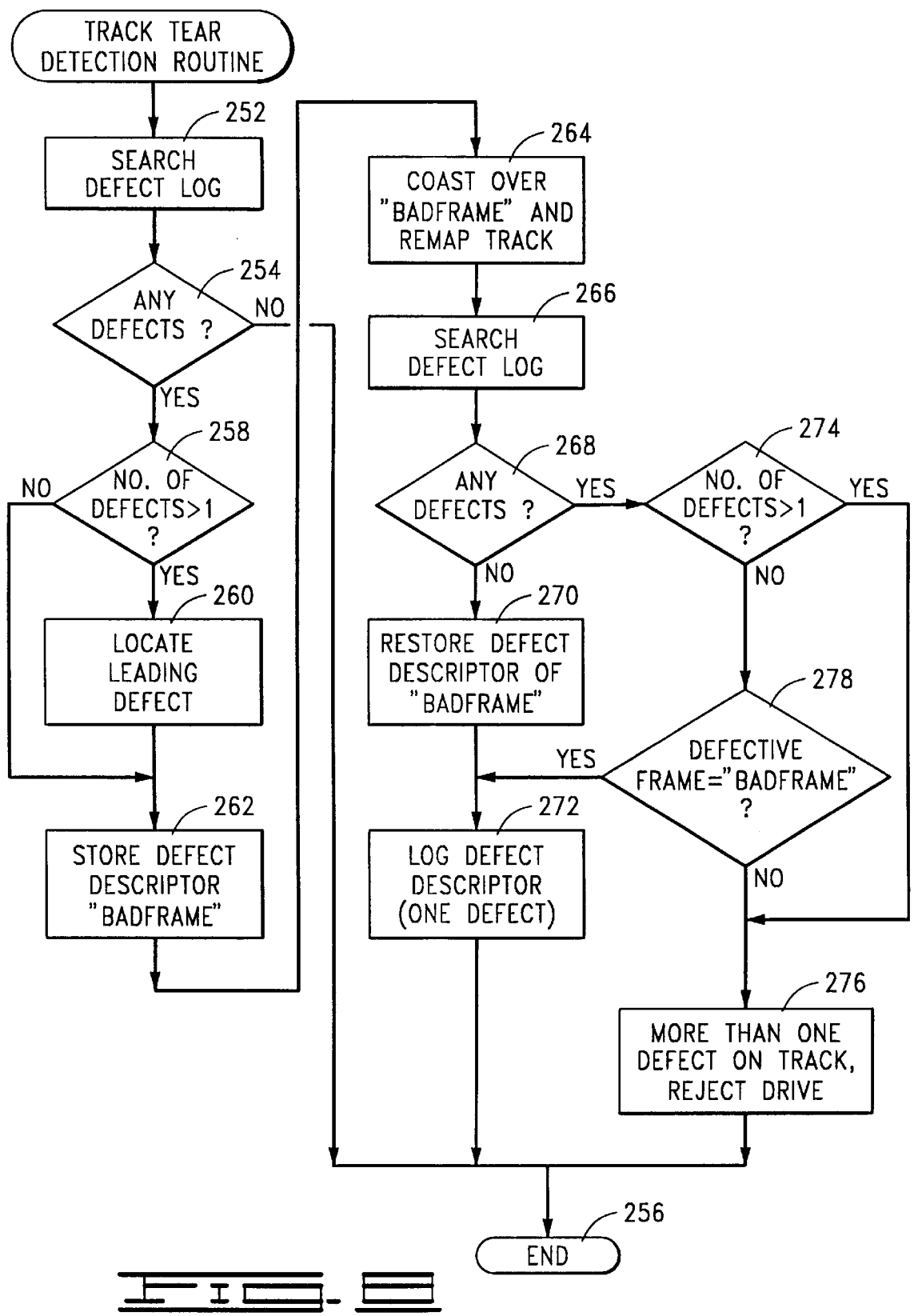
FIG. 8 is a generalized flow chart representative of a TRACK TEAR DETECTION routine, which in the preferred embodiment is performed in conjunction with the DEFECT DETECTION routine of FIG. 7. The TRACK TEAR DETECTION routine is representative of programming used by the servo processor of FIG. 3 in accordance with the preferred embodiment of the present invention.

At the completion of the operation of the routine of FIG. 7 on the selected track, the servo control circuit 150 performs a TRACK TEAR DETECTION routine, as set forth in FIG. 8. More particularly, FIG. 8 provides a flow chart representative of programming stored in servo RAM 158 and used by the servo processor 156 to determine whether the selected track has a track tear condition, such as illustrated at 164 in FIG. 3.

The TRACK TEAR DETECTION routine of FIG. 8 begins at block 252, wherein a search is performed of the defect log for the selected track to determine whether any servo defects were identified by the operation of the routine of FIG. 7. If no such defects were identified, as indicated by decision block 254, the routine ends at block 256. At such time that at least one defect for the selected track is identified from the defect log, however, the routine next determines whether the number of defects is greater than one, as shown by decision block 258. If so, the leading defect on the track is determined by block 260.

The leading defect is defined as the defect on the track having the greatest amount of defect-free track length preceding the defect. That is, for a track having two defects, unless the defects are spaced exactly opposite each other with respect to the disc center, two track lengths will separate the two defects and one of the track lengths will be shorter than the second. For clarity, the leading defect is independent of the actual servo beginning (index) of the track. One of the purposes of identifying the leading defect is to allow a determination of whether non-leading defects on the track are induced by the leading defect.

Once the leading defect is identified by block 260 (for those tracks having more than one defect), or alternatively, once the sole defect on the track is identified, the routine of FIG. 8 continues to block 262, wherein a defect descriptor for the defect is temporarily provided and stored. For purposes of clarity, the defect is identified by the descriptor "BADFRAME".

Once the BADFRAME has been identified, it is temporarily ignored by the servo control circuit 150 while the DEFECT DETECTION routine of FIG. 7 is again performed on the selected track, as shown by block 264; that is, the head 118 "coasts" over the BADFRAME (ignoring the position field information therein) and the track is remapped by block 264 to generate a new defect log for the track.

The routine then performs a search of the new defect log, block 266, and determines whether any defects now appear on the track, decision block 268. If no such defects appear, the routine continues to block 270 wherein the defect descriptor for the BADFRAME is restored. That is, in the case where only one defect initially appears on the track, and the ignoring of that defect subsequently results in no defects being detected on the track, the routine concludes that the one defect (BADFRAME) is indeed a defective servo frame and restores the identification of the same. Alternatively, in the case where more than one defect initially appears on the track, but the ignoring of the leading defect causes all other defects to disappear, it becomes apparent that the non-leading defects were being induced by the leading defect which is a true servo defect. In both of these cases the routine determines that no track tear condition is present and as up to one defect on a track is acceptable, the defect log is updated with the identification of the defect and the routine exits at 256 from block 272.

Referring back to decision block 268, at such time that defects continue to appear in the defect log after the BADFRAME has been ignored (block 264), the routine determines at decision block 274 whether more than one defect remains on the track. If so, the routine passes to block 276 wherein the drive is rejected as having more than one servo defect on the track.

At such time that the decision block 274 determines that only one defect is present on the track after the BADFRAME has been ignored as set forth by block 264, the routine passes to block 278 wherein the servo processor 156 determines whether the defect coincides with the location of the BADFRAME; if so, the track has only one defect and the routine passes to block 272 wherein the defect log is updated to reflect this situation. Alternatively, when the defect identified by decision blocks 268 and 270 is different from the BADFRAME, the flow passes from decision block 278 to block 276 and the disc drive 100 is rejected. Although the defect will rarely coincide with the BADFRAME (as the BADFRAME has been mapped out), the path from block 278 to block 272 is provided as a safety measure as well as to cover those cases wherein, for whatever reason, the effects of the ignored BADFRAME are not completely removed from the system.

It will be recognized that in the preferred embodiment the overall objective is to ensure that no track has more than one defect, so that it may not necessarily be important to determine whether the defects are caused by a track tear or by multiple, discrete defects. Thus, the routine of FIG. 8 will result in the rejection of the disc drive 100 when either a track has multiple defects or when a track has a track tear condition. Accordingly, drives having more than one defect on any given track are rejected from the manufacturing process and reworked. Such rework can include, for example, the rewriting of the servo information to the discs 108 by the servo track writer.

Figure 9:
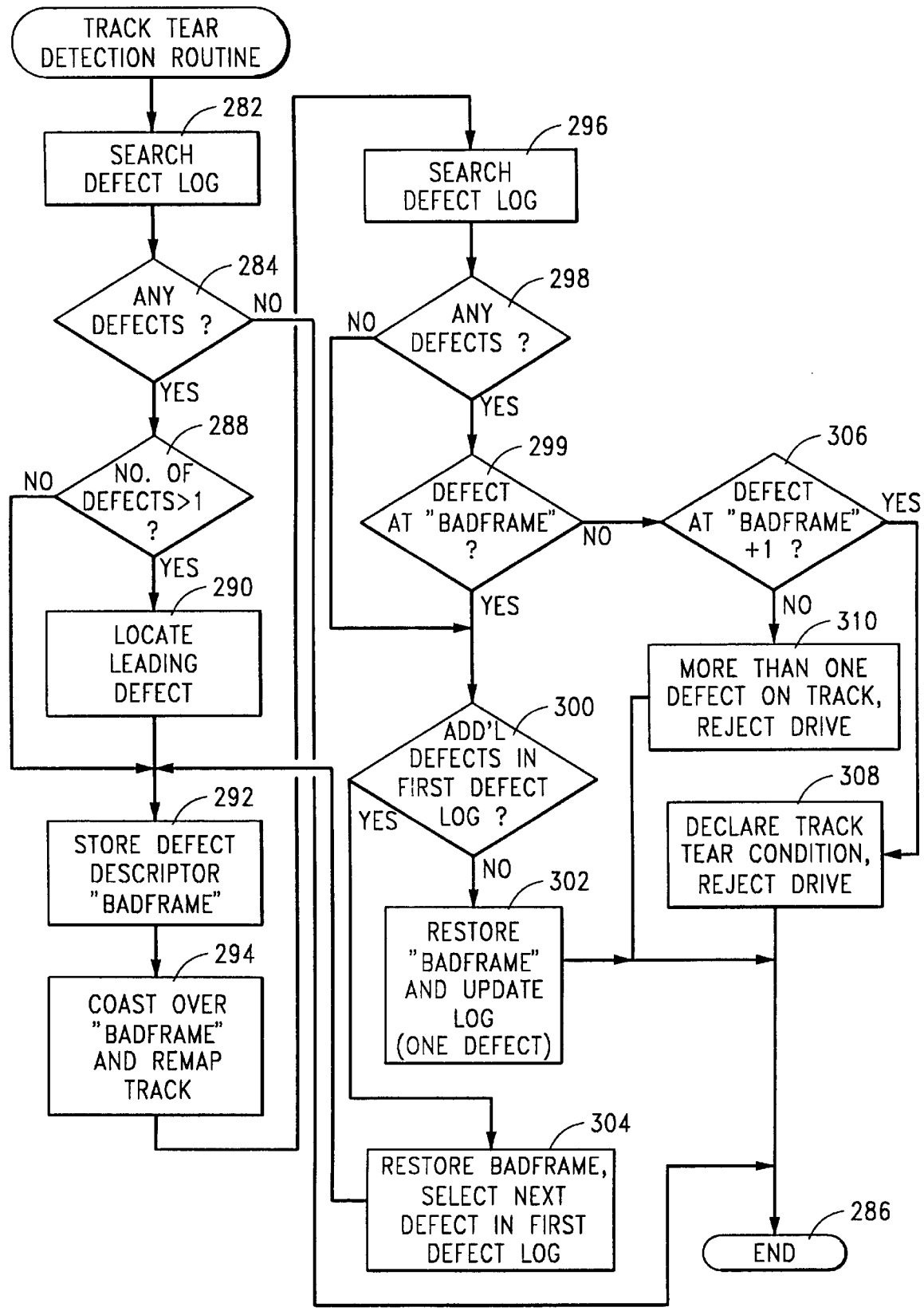
FIG. 9 is a generalized flow chart representative of an alternative TRACK TEAR DETECTION routine, which like the routine of FIG. 8, is preferably performed in conjunction with the DEFECT DETECTION routine of FIG. 7. The routine of FIG. 9 is representative of programming used by the servo processor of FIG. 3 in accordance with an alternative embodiment of the present invention.

Referring now to FIG. 9, shown therein is a second TRACK TEAR DETECTION routine, which is an alternative embodiment for the TRACK TEAR DETECTION routine of FIG. 8. The routine of FIG. 9 is similar to the routine of FIG. 8 and will also advantageously identify defective drives; however, the routine of FIG. 9 provides additional discernment between drives having a track tear condition and drives having multiple discrete servo defects on a track, as may be desired. As with the routine of FIG. 8, the routine of FIG. 9 is also preferably performed in conjunction with the DEFECT DETECTION routine of FIG. 7, although it will be readily understood that the present invention is not so limited.

The routine of FIG. 9 begins at block 282 wherein a search of a previously generated defect log for the selected track is performed to determine whether any defects have been identified therefor. If not, the routine ends, as shown by decision block 284 and END block 286.

When at least one defect is identified for the selected track, the routine continues to decision block 288, which results in the identification of the leading defect (block 290) at such time that more than one defect has been detected on the track. The routine then passes to block 292 where the sole defect, or alternatively the leading defect, is identified as BADFRAME. The BADFRAME is mapped out and the servo control circuit 150 proceeds to remap the track, block 294 and to examine a new, second defect log, block 296.

At such time that no defects appear in the second defect log, the routine determines whether the first defect log (searched by block 282) contained any additional defects, as indicated by decision block 300. If not, then the descriptor for the BADFRAME is restored (block 302) and the routine ends at 286. It will be recalled that in the preferred embodiment, up to one servo defect per track is acceptable in that the servo control circuit 150 can adequately servo on the track while ignoring the position information provided by the defective servo frame.

At such time that no defects appear in the second defect log, but multiple defects originally appeared in the first defect log, the flow passes from decision blocks 298 and 300 to block 304, wherein the next defect from the first defect log is selected and the routine is repeated, as shown, until all of the defects that originally appeared in the first defect log have been separately evaluated. Performing such additional evaluations is optional, but has been indicated for purposes of disclosure.

Alternatively, when at least one defect appears in the second defect log, as indicated by decision block 298 the routine passes to block 299, where a determination is made whether any of the defects detected in the second defect log correspond in location to the mapped out BADFRAME. As with the routine of FIG. 8, this check is provided as a safety feature and will cover those rare cases when, for whatever reason, the effects of the mapped out BADFRAME are not completely removed from the system.

At such time that at least one of the defects identified in the second defect log corresponds to the BADFRAME, the routine passes to decision block 300 and the routine continues as described above. Alternatively, when none of the defects identified in the second defect log corresponds to the BADFRAME, the routine continues to decision block 306, wherein the location of the defect or defects appearing in the second defect log is evaluated with respect to the location of the BADFRAME. That is, decision block 306 determines whether a defect appears in the frame immediately following the BADFRAME (BADFRAME+1). Because it is conceivable that two discrete servo defects might occasionally be found to occur, it is contemplated that decision block 306 further includes the requirement that the defect at BADFRAME+1 appear in the second defect log, but not in the first. More particularly, mapping out the first servo frame after a track tear will generally shift the defect to the next frame; accordingly, a track tear condition will generally result in the detection of a servo defect at the frame BADFRAME+1 after the BADFRAME has been mapped out by block 294. When this occurs, decision block 306 will detect the same and provide a rejection of the drive on the basis of a detected track tear condition, block 308. On the other hand, if the second defect log indicates the presence of defects on the track (decision block 298), but at least one of the defects is not located at BADFRAME+1, the drive is rejected on the basis of having multiple defects, as indicated by block 310.

The ability of the routines of FIGS. 8 and 9 to detect track tear conditions provides significant advantages over the prior art, in that prior art defect mapping procedures have either not been able to detect such track tears at all or have only been able to identify such as single defects, often resulting in continued write faults at the location proximate to the track tear. As previously mentioned, it will be readily understood that the DEFECT DETECTION routine of FIG. 7 has been provided for purposes of disclosure, but alternative methodologies for initially detecting servo defects can readily be employed in conjunction with the claimed invention.

Accordingly, as provided above a first defect log is generated and evaluated 252, 282 for a selected track 182. At such time that a selected servo frame 170 is identified as being defective 254, 284, a second defect log is generated and evaluated 266, 296 while the selected servo frame is ignored 264,294. The disc drive 100 is rejected at such time that defects appear in the second defect log 268, 276, 298, 308, 310, as either having multiple servo defects or a track tear 164.

Additionally, at such time that a defect appears in the second defect log immediately following the selected servo frame 306, the disc drive 100 is rejected for having a track tear 164. Additional discernment of a track tear 164 can be obtained by determining that the defect appearing in the second defect log immediately following the selected servo frame does not appear in the first defect log 306.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a disc for the storage and retrieval of data by a read/write head adjacent the disc, the disc having prerecorded servo information defining a plurality of tracks on the disc with selected servo information associated with each track, the disc drive further having a servo control circuit for using the servo information to control the position of the head with respect to the tracks on the disc, the servo information comprising a plurality of servo frames, each servo frame providing position information to the servo control circuit, a method for identifying the presence of a track tear condition characterized as a stepwise radial discontinuity in a selected track, comprising steps of:

(a) generating a first defect log for the selected track which indicates whether defects are detected for one or more servo frames associated with the selected track; and (b) at such time that the first defect log indicates that a defect is detected for a first servo frame:
  (b)(i) generating a second defect log while coasting over the selected servo frame so that the second defect log is generated without regard to the position information provided by the first servo frame, the second defect log indicating whether defects are detected for one or more of the remaining servo frames associated with the selected track; and
  (b)(ii) identifying the presence of a track tear condition when the second defect log indicates that a defect is detected for the servo frame that immediately follows the first servo frame.

2. The method of claim 1, wherein the method is performed during manufacture of the disc drive, and wherein the disc drive is rejected at such time that a track tear condition is identified.

3. A method for detecting the presence of a track tear condition characterized as a stepwise radial discontinuity in a selected track of a disc drive, the track tear condition caused by defects in servo information, the disc drive having a disc, a read/write head and a servo control circuit, the servo information defining a plurality of tracks on the disc and facilitating positional control of the read/write head relative to the tracks by the servo control circuit, the servo information comprising a plurality of servo frames, each servo frame including a position field for providing position information to the servo control circuit, the method characterized by:

(a) identifying a first defective servo frame on a selected track;

(b) identifying a second defective servo frame on the selected track while ignoring the position information of the first defective servo frame; and (c) detecting the presence of a track tear condition when the second defective servo frame immediately follows the first defective servo frame.

4. A disc drive, comprising:

a disc including servo information defining a plurality of tracks on the disc, the servo information comprising a plurality of servo frames;

a read/write head; and a servo control circuit for positioning the read/write head relative to the tracks on the disc in response to burst signals generated as the read/write head passes proximate to the servo frames of the tracks, the servo control circuit comprising:

a servo processor programmed to detect a track tear condition characterized as a stepwise radial discontinuity in a selected track by:
  (a) identifying a first defective servo frame on the selected track;
  (b) determining whether a second defective servo frame is present on the selected track while ignoring the burst signals associated with the first defective servo frame; and
  (c) detecting the presence of a track tear condition when the second defective servo frame immediately follows the first defective servo frame.

5. The method of claim 1, wherein the servo frame that immediately follows the first servo frame is characterized as a second servo frame, and wherein the identifying step (b)(ii) further comprises determining that the first defect log does not indicate that a defect is detected for the second servo frame.

6. The method of claim 3, wherein the identifying step (a) further comprises classifying each of the servo frames of the selected track as either defective or nondefective, and wherein the detecting step (c) further comprises detecting the presence of a track tear condition when the second defective servo frame was previously classified as nondefective during the operation of step (a).

7. The method of claim 3, wherein the method is performed during manufacture of the disc drive, and wherein the disc drive is rejected at such time that a track tear condition is identified.

8. The disc drive of claim 4, wherein the operation of step (a) further comprises classifying each of the servo frames of the selected track as either defective or nondefective, and wherein the operation of step (c) further comprises detecting the presence of a track tear condition when the second defective servo frame was previously classified as nondefective during the operation of step (a).

* * * * *